(12) United States Patent
Otsuka et al.

(10) Patent No.: US 7,569,201 B2
(45) Date of Patent: Aug. 4, 2009

(54) METHOD OF MANUFACTURING HONEYCOMB STRUCTURE AND SILICON CARBIDE PARTICLE FOR MANUFACTURING THE SAME

(75) Inventors: Aiko Otsuka, Nagoya (JP); Shuichi Ichikawa, Handa (JP); Takashi Harada, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 529 days.

(21) Appl. No.: 10/527,440

(22) PCT Filed: May 27, 2004

(86) PCT No.: PCT/JP2004/007257

§ 371 (c)(1),
(2), (4) Date: Dec. 13, 2005

(87) PCT Pub. No.: WO2004/106265

PCT Pub. Date: Dec. 9, 2004

(65) Prior Publication Data

US 2006/0154068 A1    Jul. 13, 2006

(30) Foreign Application Priority Data

May 29, 2003    (JP) .............................. 2003-152379

(51) Int. Cl.
*C01B 31/36* (2006.01)
*B32B 5/16* (2006.01)
*C04B 35/64* (2006.01)

(52) U.S. Cl. .................. 423/345; 428/402; 264/630

(58) Field of Classification Search .................. 423/345; 428/402; 264/630
See application file for complete search history.

(56) References Cited

U.S. PATENT DOCUMENTS

| 5,389,585 A * | 2/1995 | Konig et al. .................. 501/87 |
| 2003/0072917 A1* | 4/2003 | Campbell .................... 428/141 |
| 2006/0154068 A1* | 7/2006 | Otsuka et al. ................ 428/402 |

FOREIGN PATENT DOCUMENTS

JP    04-280088    * 10/1992

(Continued)

OTHER PUBLICATIONS

Harris, Gary L. (Ed.) Properties of Silicon Carbide (p. 3). Institution of Engineering (1995). Online version available at: http://knovel.com/web/portal/browse/display?_EXT_KNOVEL_DISPLAY_bookid=1147&VerticalID=0 . Visited Sep. 16, 2008.*

(Continued)

*Primary Examiner*—Timothy C Vanoy
*Assistant Examiner*—Daniel Berns
(74) *Attorney, Agent, or Firm*—Oliff & Berridge, PLC

(57) ABSTRACT

A method of manufacturing a honeycomb structure. (1) Water is added to silicon carbide particles and kneaded into a kneaded raw material. The silicon carbide particles have an average particle diameter of not less than 2 μm and not more than the honeycomb rib thickness×0.23 and a logarithmic standard deviation of the particle size distribution of not less than 0.15 and not more than 0.40 (step S11). (2) The kneaded raw material is extruded by extrusion into a honeycomb extruded body (step S12). (3) The extruded body is dried (step S13), calcined (step S14), and fired (step S15).

5 Claims, 3 Drawing Sheets

FOREIGN PATENT DOCUMENTS

| | | |
|---|---|---|
| JP | A 2001-151579 | 6/2001 |
| JP | A 2001-261442 | 9/2001 |
| JP | A 2002-356383 | 12/2002 |
| WO | WO02/070433 * | 9/2002 |

OTHER PUBLICATIONS

"Cordierite." Grolier Multimedia Encyclopedia (2008). Grolier Online, http://gme.grolier.com/cgi-bin/article?assetid=0072180-0 . Visited Sep. 16, 2008.*

* cited by examiner

METHOD OF MANUFACTURING HONEYCOMB STRUCTURE AND SILICON CARBIDE PARTICLE FOR MANUFACTURING THE SAME

TECHNICAL FIELD

The present invention relates to a method of manufacturing a honeycomb structure used as a filter for collecting tiny particles within gas emissions from an engine, a boiler, or the like, a catalyst support for supporting a catalyst which cleans up toxic substances in the gas emissions, or the like, and relates to silicon carbide particles for use in the method of manufacturing a honeycomb structure.

BACKGROUND ART

As a raw material for manufacturing the aforementioned honeycomb structure used for the filter, catalyst support, or the like, silicon carbide particles excellent in heat and chemical resistance can be used. However, the honeycomb structure of silicon carbide manufactured by extrusion, which is a general method used for forming a honeycomb structure, has problems of high manufacturing costs and the like.

To avoid these problems, there is a technology to reduce the manufacturing costs by sintering at comparatively low firing temperature (see, for example, Japanese Patent Laid-Open No. 2002-356383).

One of the reasons why the honeycomb structure of silicon carbide is expensive is that the honeycomb structure obtained by injecting a kneaded raw material into a die and extruding the same is likely to have defects such as fractures and small holes caused in ribs thereof and has sometimes low productivity.

Another one of the reasons for the expensive honeycomb structure of silicon carbide is, in addition to the occurrence of defects, that the silicon carbide raw material is expensive. A silicon carbide raw material generally used is for applications as abrasive powder and has a small range of particle size distribution as standardized by JIS R 6001. After the silicon carbide is classified in a manufacturing process, a large amount of material which does not meet the standard remains. This makes it difficult to reduce the costs.

Therefore, an object of the present invention is to reduce the manufacturing costs of the porous honeycomb structure made of silicon carbide by allowing a material which has not hitherto been used to be used is while maintaining a suitable incidence of the defects such as fractures and small holes of ribs, a suitable porosity, and the like.

DISCLOSURE OF THE INVENTION

A first aspect of the present invention is a method of manufacturing a honeycomb structure, in which (1) water is added to silicon carbide particles and kneaded into a kneaded raw material, the silicon carbide having an average particle diameter of not less than 2 μm and not more than a honeycomb rib thickness×0.23 and with a logarithmic standard deviation of a particle size distribution of not less than 0.15 and not more than 0.40; (2) the kneaded raw material is extruded by extrusion into a honeycomb extruded body; and (3) the extruded body is dried, calcined, and fired.

BEST MODE FOR CARRYING OUT THE INVENTION

Hereinafter, a description is given of an embodiment of the present invention with reference to the drawings. The present invention should not be limited to the embodiment.

Figure 1:
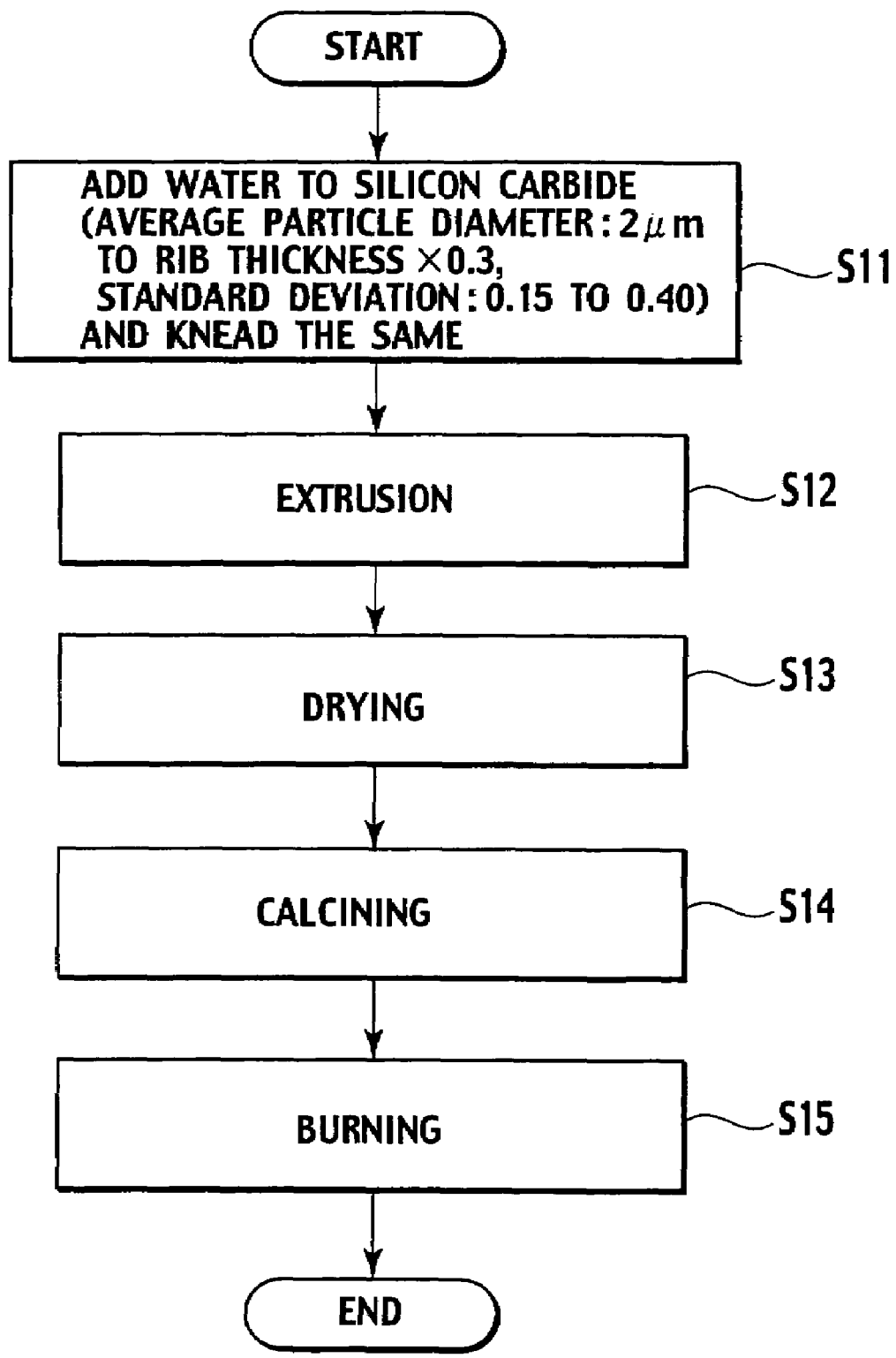
FIG. 1 is a flowchart showing a flow of a process of an embodiment.

As shown in FIG. 1, in this embodiment, first, water is added to silicon carbide particles and then kneaded into a kneaded raw material. Herein, the silicon carbide has an average diameter of not less than 2 μm and not more than a honeycomb rib thickness×0.23 and a logarithmic standard deviation of a particle size distribution of not less than 0.15 and not more than 0.40 (step S11). Next, the kneaded raw material is extruded by extrusion into a honeycomb-shaped extruded body (step S12). Subsequently, the extruded body is dried (step S13), further calcined (step S14), and then fired (step S15).

(1) Preparation of Kneaded Raw Material

First, water, an organic binder, and the like are added to the silicon carbide particles and then kneaded to prepare the kneaded raw material.

The silicon carbide particles have an average diameter of not less than 2 μm and not more than a honeycomb rib thickness×0.23 and a logarithmic standard deviation of a particle size distribution of not less than 0.15 and not more than 0.40. The silicon carbide particles are composed of one type of raw material or are prepared by mixing several types of raw materials so as to satisfy the aforementioned ranges.

Figure 2:
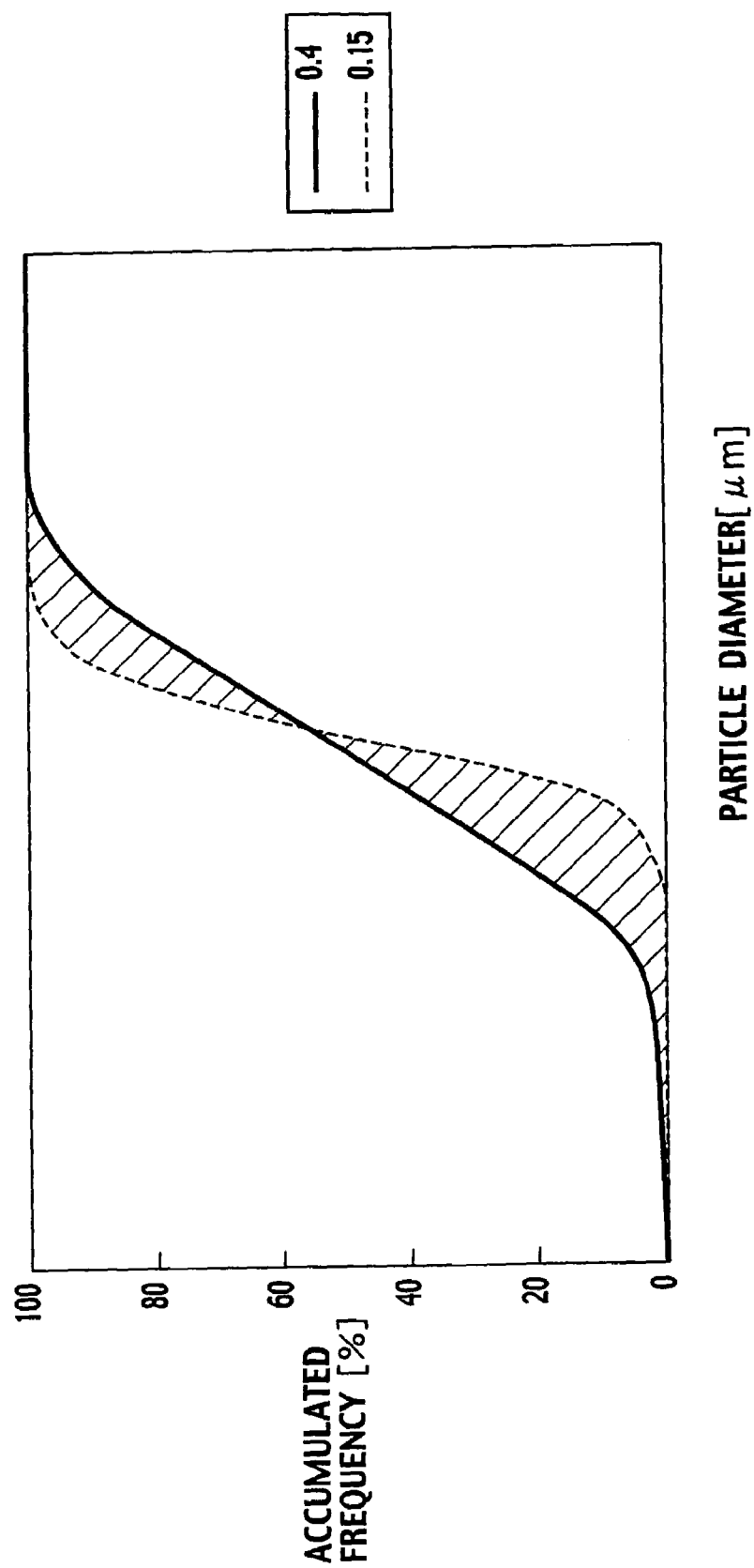
FIG. 2 is a view showing a relationship between particle diameter (μm) and accumulated frequency (%) of silicon carbide particles used in this embodiment.

FIG. 2 shows a relationship between particle diameter (μm) and accumulated frequency (%) of the silicon carbide particles used in this embodiment. Herein, the x-axis indicates the logarithm of the particle diameter, and the y-axis indicates the accumulated frequency. The relationship between the particle diameter and accumulated frequency of the silicon carbide particles used in the embodiment has a lognormal distribution, and the relationship between the particle diameter and accumulated frequency is as shown in FIG. 2. In FIG. 2, the shaded area indicates an area of the logarithmic standard deviation of not less than 0.15 and not more than 0.4. Values of each component constituting two graphs shown in FIG. 2 are shown in Table 1.

TABLE 1

| SD = 0.40 | | SD = 0.15 | |
| --- | --- | --- | --- |
| PARTICLE DIAMETER [μm] | ACCUMULATED FREQUENCY | PARTICLE DIAMETER [μm] | ACCUMULATED FREQUENCY |
| 1019.5 | 100.0 | 1019.5 | 100.0 |
| 890.1 | 100.0 | 890.1 | 100.0 |
| 777.1 | 100.0 | 777.1 | 100.0 |
| 678.5 | 100.0 | 678.5 | 100.0 |
| 592.3 | 100.0 | 592.3 | 100.0 |
| 517.2 | 100.0 | 517.2 | 100.0 |
| 451.5 | 100.0 | 451.5 | 100.0 |
| 394.2 | 100.0 | 394.2 | 100.0 |
| 344.2 | 99.9 | 344.2 | 100.0 |
| 300.5 | 99.8 | 300.5 | 100.0 |

TABLE 1-continued

| SD = 0.40 | | SD = 0.15 | |
|---|---|---|---|
| PARTICLE DIAMETER [μm] | ACCUMULATED FREQUENCY | PARTICLE DIAMETER [μm] | ACCUMULATED FREQUENCY |
| 262.3 | 99.5 | 262.3 | 100.0 |
| 229.0 | 99.6 | 229.0 | 100.0 |
| 200.0 | 99.2 | 200.0 | 100.0 |
| 174.6 | 98.0 | 174.6 | 100.0 |
| 152.4 | 97.0 | 152.4 | 100.0 |
| 133.1 | 95.0 | 133.1 | 99.9 |
| 116.2 | 93.0 | 116.2 | 99.7 |
| 101.4 | 89.8 | 101.4 | 99.2 |
| 88.6 | 86.0 | 88.6 | 98.3 |
| 77.3 | 82.0 | 77.3 | 96.5 |
| 67.5 | 78.0 | 67.5 | 93.4 |
| 59.0 | 72.0 | 59.0 | 88.2 |
| 51.5 | 67.0 | 51.5 | 80.3 |
| 44.9 | 62.0 | 44.9 | 70.6 |
| 39.2 | 57.0 | 39.2 | 57.9 |
| 34.3 | 52.0 | 34.3 | 42.8 |
| 29.9 | 46.0 | 29.9 | 28.2 |
| 26.1 | 41.0 | 26.1 | 16.4 |
| 22.8 | 36.0 | 22.8 | 8.9 |
| 19.9 | 31.5 | 19.9 | 4.8 |
| 17.4 | 7.0 | 17.4 | 2.6 |
| 15.2 | 22.0 | 15.2 | 1.4 |
| 13.2 | 17.5 | 13.2 | 0.7 |
| 11.6 | 13.3 | 11.6 | 0.3 |
| 10.1 | 9.5 | 10.1 | 0.1 |
| 8.8 | 6.6 | 8.8 | 0.0 |
| 7.7 | 4.6 | 7.7 | 0.0 |
| 6.7 | 3.3 | 6.7 | 0.0 |
| 5.9 | 2.5 | 5.9 | 0.0 |
| 5.1 | 1.9 | 5.1 | 0.0 |
| 4.5 | 1.6 | 4.5 | 0.0 |
| 3.9 | 1.4 | 3.9 | 0.0 |
| 3.4 | 1.2 | 3.4 | 0.0 |
| 3.0 | 1.0 | 3.0 | 0.0 |
| 2.6 | 0.9 | 2.6 | 0.0 |
| 2.3 | 0.8 | 2.3 | 0.0 |
| 2.0 | 0.7 | 2.0 | 0.0 |
| 1.7 | 0.6 | 1.7 | 0.0 |
| 1.5 | 0.5 | 1.5 | 0.0 |
| 1.3 | 0.4 | 1.3 | 0.0 |
| 1.2 | 0.3 | 1.2 | 0.0 |
| 1.0 | 0.2 | 1.0 | 0.0 |
| 0.9 | 0.2 | 0.9 | 0.0 |
| 0.8 | 0.1 | 0.8 | 0.0 |

The organic binder is, for example, a methyl cellulose-based binder, an ethyl cellulose-based binder, polyvinyl alcohol, or the like.

The kneaded raw material can be mixed with other additives when needed. Other additives can be, for example, a dispersing agent for promoting dispersion of the silicon carbide into water, a pore-forming agent for forming pores, and the like. Examples of the dispersing agent include ethylene glycol, dextrin, fatty-acid soap, and polyalcohol. Examples of the pore-forming agent include graphite, flour, starch, phenol resin, and polyethylene terephthalate.

(2) Extrusion

Next, the kneaded raw material is extruded by extrusion into a molded body. The kneading method is not particularly limited, and it is possible to use a kneader such as a general kneader, a pressure kneader, a single shaft continuous extruder, double shaft continuous kneader/extruder, and a vacuum kneader. For example, the kneaded raw material is molded into a cylinder by the vacuum kneader and then molded into a honeycomb shape by a ram extruder.

Figure 3:
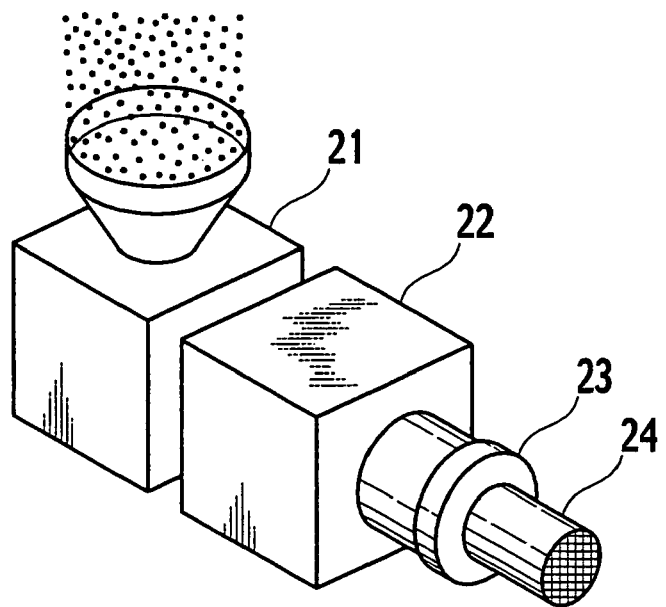
FIG. 3 is a perspective view schematically showing a constitution of a mixer, extruder, and a die portion according to the embodiment of the present invention.

For example, as shown FIG. 3, the raw material containing the silicon carbide particles, water, and the like is kneaded by a mixer 21, pressed into a die portion 23 by an extruder 22, and then extruded from the die portion 23 into a molded body 24.

Figure 4:
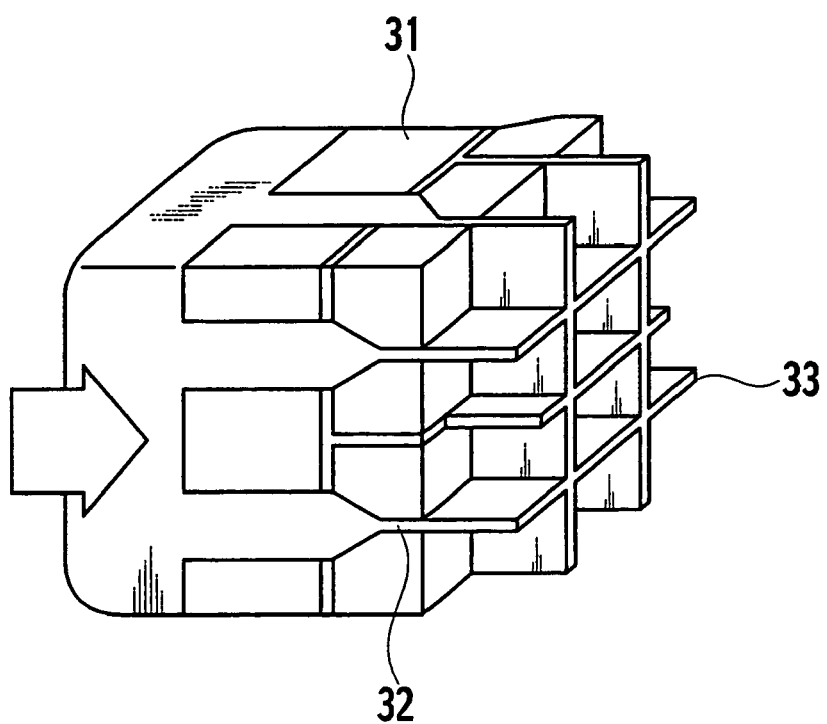
FIG. 4 is a perspective view showing an internal structure of the die portion shown in FIG. 3.

As shown in FIG. 4, the kneaded raw material is pressed into a die 31, which is a part of the die portion 23 (FIG. 3), from a side of the mixer (the left side in FIG. 3) and gradually pressed into slits 32 on an outlet side, which form a honeycomb structure, to be spread in a cross-shape. The adjacent kneaded raw materials are compressed and joined into ribs 33, thus obtaining a unitary honeycomb structure as a whole.

(3) Drying

Next, the molded body is dried. Specifically, for example, hot air is blown onto the molded body for drying. The drying method may be at least one selected from a group consisting microwave drying, dielectric drying, reduced pressure drying, vacuum drying, and freeze drying. For quick drying, a combination of hot air drying and microwave drying or dielectric drying is preferred.

(4) Calcining

Furthermore, the honeycomb molded body obtained as described above is calcined into a calcined body. The calcining means an operation of fired and removing the organic substances (the binder, dispersing agent, pore-forming agent, and the like) within the molded body. Generally, the combustion temperature of the binder is about 200° C., and the combustion temperature of the pore-forming agent is about 300 to 900° C. Calcining temperature should be set to about 200 to 1000° C. Calcining time is not particularly limited, and usually one to ten hours.

(5) Firing

Finally, the calcined body obtained as described above is fired to obtain a porous honeycomb structure. The firing is an operation of sintering and densifying an aggregate grain raw material within the calcined body to secure predetermined strength. The firing temperature is about 1400 to 2400° C., and the firing temperature holding time is about 0.5 to 5 hours. To prevent oxidation, a non-oxidizing atmosphere is preferred.

Reasons for the average diameter of the silicon carbide particles of not less than 2 μm and not more than the honeycomb rib thickness×0.23 and the logarithmic standard deviation of the particle size distribution of not less than 0.15 and not more than 0.40 are as follows.

When the average particle diameter is less than 2 μm, the porosity of the ribs 33 of the honeycomb structure obtained by firing is less than 40% due to an effect of filling voids with the tiny particles, thus increasing pressure loss of emitted exhaust gas with respect to the exhaust gas entering the honeycomb structure. In addition, the heat capacity thereof is increased, which is not preferred.

When the average particle size is larger than the honeycomb rib thickness×0.23, the powder of the raw material clogs the slits of the extruder die. Accordingly, many defects such as fractures and small holes are caused in the honeycomb ribs in the extruded body, which is not preferred.

The average particle diameter is a 50% particle diameter measured by a Stokes liquid phase sedimentation method with an X-ray transmission type particle size distribution analyzer (for example, SediGraph 5000-2 made by Shimadzu Corporation or the like).

When the logarithmic standard deviation is smaller than 0.15, the fluidity of the kneaded raw material injected into the extruder die is low to cause many defects in shape such as small holes generated in the honeycomb ribs and lacks of the honeycomb ribs, which is not preferred.

Moreover, it is preferable that the logarithmic standard deviation is not smaller than 0.17. The logarithmic standard deviation set to not smaller than 0.17 can largely prevent reduction in the fluidity and occurrence of shape defects.

When the logarithmic standard deviation is larger than 0.4, in other words, when the particle size widely varies, small particles enter gaps between large particles to fill the pores of the honeycomb ribs, and the porosity of the sintered body is reduced, which is not preferred.

The logarithmic standard deviation of the particle size distribution is calculated as follows, for example.

First, the particle sizes and the accumulated frequency of each particle size are calculated by a laser diffraction method, a precipitation method, an electrical resistance method, or the like. 80% of data fall within a range of the accumulated frequency between 10% and 90%. According to the lognormal distribution table, 80% of the data fall between ±1.28σ around an average. Accordingly, the following equation is established when D10 is a particle diameter corresponding to an accumulated frequency of 10%, D90 is a particle diameter corresponding to an accumulated frequency of 90%, and SD is the logarithmic standard deviation.

$$\log(D10)-\log(D90)=2\times1.28\times SD$$

Therefore, the following equation is established.

$$SD=(\log(D10)-\log(D90))/(2\times1.28)$$

The logarithmic standard deviation SD can be thus calculated from measured values of D90 and D10.

Preferably, the content of the silicon carbide is not less than 50 wt %. When the content of the silicon carbide is less than 50 wt %, for example, in the case where another contained raw material is used as a binder for the silicon carbide as the aggregate, the binder (metallic component or glass component) is too much, and the honeycomb structure excessively contracts by sintering, thus causing adverse effects such as reduction in porosity and average pore diameter. The contained raw materials may be silicon, clay, glass, and the like used as the binder and may be a raw material used as a sintering aid which includes at least one of B, C, Na, K, Al, Si, Ca, Cr, Mn, Fe, Ni, Sr, Y, Zr, and Ba.

Furthermore, preferably, the proportion of particles with a particle diameter of not less than half the honeycomb rib thickness is not more than 5 wt %. When the proportion of particles with a particle diameter of not less than half the honeycomb rib thickness (that is, slit width) is more than 5 wt %, the powder of the raw material clogs the slit, and causing many defects such as fractures and small holes in the honeycomb ribs.

EXAMPLES

Example 1

Twenty parts by weight of silicon as the binder was added to 80 parts by weight of the silicon carbide. Herein, the silicon carbide had an average particle diameter of 2 μm, a logarithmic standard deviation of the particle size distribution of 0.19, and a proportion of particles with a particle diameter of not less than half the rib thickness of 0 wt %. The mixture was added to methyl cellulose as the organic binder, starch as the pore-forming agent, and a proper amount of water and mixed and kneaded by a vacuum kneader to prepare the kneaded raw material.

This kneaded raw material was extruded using a die with the later-described cell shape, rib thickness, and cell density to be molded into a honeycomb shape and then dried by a combination of hot air drying and microwave drying, thus obtaining a honeycomb molded body.

In the entire shape of the obtained honeycomb molded body, the end face shape (face where cells are opened) was a square with 35 mm×35 mm, the length was 152 mm, the rib thickness was 203 μm, and the cell density was 300 cells per square inch.

Thereafter, the honeycomb molded body was calcined at about 550° C. for 3 hours in atmosphere and then fired at about 1450° C. for 2 hours in non-oxidizing atmosphere, thus obtaining porous honeycomb structure.

Example 2

A honeycomb structure was obtained in the same manner as Example 1 except that the silicon carbide powder had an average particle is diameter of 10 μm, a logarithmic standard deviation of the particle size distribution 0.28, and a proportion of particles with a particle diameter of not less than half the rib thickness of 0.2%.

Example 3

A honeycomb structure was obtained in the same manner as Example 1 except that the silicon carbide powder had an average particle diameter of 20 μm, a logarithmic standard deviation of the particle size distribution 0.40, and a proportion of particles with a particle diameter of not less than half the rib thickness of 1.5 wt %.

Comparative Example 1

A honeycomb structure was obtained in the same manner as Example 1 except that the silicon carbide powder had a logarithmic standard deviation of the particle size distribution of 0.45.

Comparative Example 2

A honeycomb structure was obtained in the same manner as Example 1 except that the silicon carbide powder had an average particle diameter of 1.4 μm and a logarithmic standard deviation of the particle size distribution of 0.32.

Comparative Example 3

A honeycomb structure was obtained in the same manner as Example 1 except that the silicon carbide powder had an average particle diameter of 50 μm, a logarithmic standard deviation of the particle size distribution of 0.15, and a proportion of particles with a particle diameter of not less than half the rib thickness of 7.0 wt %.

Comparative Example 4

A honeycomb structure was obtained in the same manner as Example 1 except that the silicon carbide powder had an average particle diameter of 33 μm and a logarithmic standard deviation of the particle size distribution of 0.12.

Example 4

Twenty parts by weight of silicon as the binder was added to 80 parts by weight of the silicon carbide. The silicon carbide had an average particle diameter of 35 μm, a logarithmic standard deviation of the particle size distribution of 0.15, and a proportion of particles with a particle diameter of not less than half the rib thickness of 0.3 wt %. The mixture was added to methyl cellulose as the organic binder, starch as the pore-forming agent, and a proper amount of water and mixed and kneaded by a vacuum kneader to prepare the kneaded raw material.

This kneaded raw material was extruded using a die with the later-described cell shape, rib thickness, and cell density to be molded into a honeycomb shape and then dried by a combination of hot air drying and microwave drying, thus obtaining a honeycomb molded body.

In the entire shape of the obtained honeycomb molded body, the end face shape (face where cells are opened) was a square with 35 mm×35 mm, the length was 152 mm, the rib thickness was 305 μm, and the cell density was 300 cells per square inch.

Thereafter, the honeycomb molded body was calcined at about 550° C. for 3 hours in atmosphere and then fired at about 1450° C. for 2 hours in non-oxidizing atmosphere, thus obtaining a porous honeycomb structure.

Example 5

A honeycomb structure was obtained in the same manner as Example 4 except that the silicon carbide powder had an average particle diameter of 60 μm, a logarithmic standard deviation of the particle size distribution of 0.19, and a proportion of particles with a particle diameter of not less than half the rib thickness of 2.8 wt %.

Example 6

A honeycomb structure was obtained in the same manner as Example 4 except that the silicon carbide powder had an average particle diameter of 70 μm, a logarithmic standard deviation of the particle size distribution of 0.17, and a proportion of particles with a particle diameter of not less than half the rib thickness of 5.0 wt %.

Comparative Example 5

A honeycomb structure was obtained in the same manner as Example 4 except that the silicon carbide powder had a logarithmic standard deviation of the particle size distribution of 0.12 and a proportion of particles with a particle diameter of not less than half the rib thickness of 0 wt %.

Comparative Example 6

A honeycomb structure was obtained in the same manner as Example 4 except that the silicon carbide powder had an average particle diameter of 72 μm, a logarithmic standard deviation of the particle size distribution of 0.17, and a proportion of particles with a particle diameter of not less than half the rib thickness of 6.5 wt %.

Comparative Example 7

A honeycomb structure was obtained in the same manner as Example 4 except that the silicon carbide powder had an average particle diameter of 1.4 μm, a logarithmic standard deviation of the particle size distribution of 0.32, and a proportion of particles with a particle diameter of not less than half the rib thickness of 0 wt %.

Comparative Example 8

A honeycomb structure was obtained in the same manner as Example 4 except that the silicon carbide powder had an average particle diameter of 32 μm, a logarithmic standard deviation of the particle size distribution of 0.44, and a proportion of particles with a particle diameter of not less than half the rib thickness of 4.0 wt %.

Example 7

Twenty parts by weight of silicon as the binder was added to 80 parts by weight of the silicon carbide. The silicon carbide had an average particle diameter of 40 μm, a logarithmic standard deviation of the particle size distribution of 0.25, and a proportion of particles with a particle diameter of not less than half the rib thickness of 1.6 wt %. The mixture was added to methyl cellulose as the organic binder, starch as the pore-forming agent, and a proper amount of water and mixed and kneaded by a vacuum kneader to prepare the kneaded raw material.

This kneaded raw material was extruded using a die with the later-described cell shape, rib thickness, and cell density to be molded into a honeycomb shape and then dried by a combination of hot air drying and microwave drying, thus obtaining a honeycomb molded body.

In the entire shape of the obtained honeycomb molded body, the end face shape (face where cells are opened) was a square with 35 mm×35 mm, the length was 254 mm, the rib thickness was 381 μm, and the cell density was 200 cells per square inch.

Thereafter, the honeycomb molded body was calcined at about 550° C. for 3 hours in atmosphere and then fired at about 1450° C. for 2 hours in non-oxidizing atmosphere, thus obtaining a porous honeycomb structure.

Example 8

A honeycomb structure was obtained in the same manner as Example 7 except that the silicon carbide powder had an average particle diameter of 87 μm, a logarithmic standard deviation of the particle size distribution of 0.15, and a proportion of particles with a particle diameter of not less than half the rib thickness of 5.0 wt %.

Comparative Example 9

A honeycomb structure was obtained in the same manner as Example 7 except that the silicon carbide powder had an average particle diameter of 90 μm, a logarithmic standard deviation of the particle size distribution of 0.16, and a proportion of particles with a particle diameter of not less than half the rib thickness of 10.6 wt %.

Comparative Example 10

A honeycomb structure was obtained in the same manner as Example 7 except that the silicon carbide powder had an average particle diameter of 65 μm, a logarithmic standard deviation of the particle size distribution of 0.14, and a proportion of particles with a particle diameter of not less than half the rib thickness of 5.0 wt %.

Comparative Example 11

A honeycomb structure was obtained in the same manner as is Example 7 except that the silicon carbide powder had an average particle diameter of 36 μm, a logarithmic standard deviation of the particle size distribution of 0.43, and a proportion of particles with a particle diameter of not less than half the rib thickness of 4.5 wt %.

Example 9

A hundred parts by weight of the silicon carbide, which had an average particle diameter of 12 μm, a logarithmic standard deviation of the particle size distribution of 0.25, and a proportion of particles with a particle diameter of not less than half the rib thickness of 0 wt %, was added with methyl cellulose as the organic binder, iron oxide and yttrium oxide as the sintering aid, starch as the pore-forming agent, and a proper amount of water and mixed and kneaded by the vacuum kneader to prepare the kneaded raw material.

This kneaded raw material was extruded using a die with the later-described cell shape, rib thickness, and cell density to be molded into a honeycomb shape and then dried by a combination of hot air drying and microwave drying, thus obtaining a honeycomb molded body.

In the entire shape of the obtained honeycomb molded body, the end face shape (face where cells are opened) was a square with 35 mm×35 mm, the length was 254 mm, the rib thickness was 381 μm, and the cell density was 200 cells per square inch.

Thereafter, the honeycomb molded body was calcined at about 550° C. for 3 hours in atmosphere and then fired at about 2300° C. for 2 hours in non-oxidizing atmosphere, thus obtaining a porous honeycomb structure.

Comparative Example 12

A honeycomb structure was obtained in the same manner as Example 9 except that the silicon carbide powder had an average particle diameter of 90 μm, a logarithmic standard deviation of the particle size distribution of 0.16, and a proportion of particles with a particle diameter of not less than half the rib thickness of 10.6 wt %.

Comparative Example 13

A honeycomb structure was obtained in the same manner as Example 9 except that the silicon carbide powder had an average particle diameter of 65 μm, a logarithmic standard deviation of the particle size distribution of 0.14, and a proportion of particles with a particle diameter of not less than half the rib thickness of 5.0 wt .

Comparative Example 14

A honeycomb structure was obtained in the same manner as Example 9 except that the silicon carbide powder had an average particle diameter of 36 μm, a logarithmic standard deviation of the particle size distribution of 0.43, and a proportion of particles with a particle diameter of not less than half the rib thickness of 4.5 wt %.

Comparative Example 15

A honeycomb structure was obtained in the same manner as Example 9 except that the silicon carbide powder had an average particle diameter of 1.4 μm, a logarithmic standard deviation of the particle size distribution of 0.32, and a proportion of particles with a particle diameter of not less than half the rib thickness of 0 wt %.

Example 10

Twenty parts by weight of glass frit was added to 80 parts by weight of the silicon carbide. The silicon carbide had an average particle diameter of 35 μm, a logarithmic standard deviation of the particle size distribution of 0.15, and a proportion of particles with a particle diameter of not less than half the rib thickness of 0.3 wt %. The mixture was added to methyl cellulose as the organic binder, starch as the pore-forming agent, and a proper amount of water and mixed and kneaded by the vacuum kneader to prepare the kneaded raw material.

This kneaded raw material was extruded using a die with the later-described cell shape, rib thickness, and cell density to be molded into a honeycomb shape and then dried by a combination of hot air drying and microwave drying, thus obtaining a honeycomb molded body. In the entire shape of the obtained honeycomb molded body, the end face shape (face where cells are opened) was a square with 35 mm×35 mm, the length was 254 mm, the rib thickness was 305 μm, and the cell density was 300 cells per square inch.

Thereafter, the honeycomb molded body was calcined at about 550° C. for 3 hours in atmosphere and then fired at about 1450° C. for 2 hours in non-oxidizing atmosphere, thus obtaining a porous honeycomb structure.

Comparative Example 16

A honeycomb structure was obtained in the same manner as Example 10 except that the silicon carbide powder had a logarithmic standard deviation of the particle size distribution of 0.12 and a proportion of particles with a particle diameter of not less than half the rib thickness of 0 wt %.

Comparative Example 17

A honeycomb structure was obtained in the same manner as Example 10 except that the silicon carbide powder had an average particle diameter of 72 μm, a logarithmic standard deviation of the particle size distribution of 0.17, and a proportion of particles with a particle diameter of not less than half the rib thickness of 6.5 wt %.

Comparative Example 18

A honeycomb structure was obtained in the same manner as Example 10 except that the silicon carbide powder had an average particle diameter of 32 μm, a logarithmic standard deviation of the particle size distribution of 0.44, and a proportion of particles with a particle diameter of not less than half the rib thickness of 4.0 wt %.

[Evaluation]

Examples 1 to 10 and Comparative Examples 1 to 19 were evaluated in terms of the moldability of the honeycomb molded body and the porosity of the porous honeycomb structure. The moldability of the honeycomb molded body was visually evaluated, and the porosity of the porous honeycomb structure was evaluated by a mercury injection method. Results thereof are shown in Table 2. Note that Defect (1) indicates that many defects of fractures and improper molding due to clogging of the die were caused, and Defect (2) indicates that many defects such as small holes, fractures, and the like were caused by the low fluidity of the kneaded material within the die orifice.

TABLE 2

| | MAIN RAW MATERIAL | HONEYCOMB RIB THICKNESS [μm] | AVERAGE PARTICLE DIAMETER [μm] | AVERAGE PARTICLE DIAMETER/RIB THICKNESS | STANDARD DEVIATION OF PARTICLE SIZE DISTRIBUTION [μM] |
|---|---|---|---|---|---|
| EXAMPLE 1 | SILICON CARBIDE 80% + | 203 | 2 | 0.01 | 0.19 |
| EXAMPLE 2 | SILICON 20% | 203 | 10 | 0.05 | 0.28 |
| EXAMPLE 3 | | 203 | 20 | 0.10 | 0.40 |
| EXAMPLE 4 | | 305 | 35 | 0.11 | 0.15 |
| EXAMPLE 5 | | 305 | 60 | 0.20 | 0.19 |
| EXAMPLE 6 | | 305 | 70 | 0.23 | 0.17 |
| EXAMPLE 7 | | 381 | 40 | 0.10 | 0.25 |
| EXAMPLE 8 | | 381 | 87 | 0.23 | 0.15 |
| EXAMPLE 9 | SILICON CARBIDE 100% | 381 | 12 | 0.03 | 0.25 |
| EXAMPLE 10 | SILICON CARBIDE 80% + GLASS FRIT 20% | 305 | 35 | 0.11 | 0.15 |
| COMPARATIVE EXAMPLE 1 | SILICON CARBIDE 80% + | 203 | 2 | 0.01 | 0.45 |
| COMPARATIVE EXAMPLE 2 | SILICON 20% | 203 | 1.4 | 0.01 | 0.32 |
| COMPARATIVE EXAMPLE 3 | | 203 | 50 | 0.25 | 0.15 |
| COMPARATIVE EXAMPLE 4 | | 203 | 33 | 0.16 | 0.12 |
| COMPARATIVE EXAMPLE 5 | | 305 | 35 | 0.11 | 0.12 |
| COMPARATIVE EXAMPLE 6 | | 305 | 72 | 0.24 | 0.17 |
| COMPARATIVE EXAMPLE 7 | | 305 | 1.4 | 0.00 | 0.32 |
| COMPARATIVE EXAMPLE 8 | | 305 | 32 | 0.10 | 0.44 |
| COMPARATIVE EXAMPLE 9 | | 381 | 90 | 0.24 | 3.81 |
| COMPARATIVE EXAMPLE 10 | | 381 | 65 | 0.17 | 0.14 |
| COMPARATIVE EXAMPLE 11 | | 381 | 36 | 0.09 | 0.43 |
| COMPARATIVE EXAMPLE 12 | SILICON CARBIDE 100% | 381 | 90 | 0.24 | 0.16 |
| COMPARATIVE EXAMPLE 13 | | 381 | 65 | 0.17 | 0.14 |
| COMPARATIVE EXAMPLE 14 | | 381 | 36 | 0.09 | 0.43 |
| COMPARATIVE EXAMPLE 15 | | 381 | 1.4 | 0.004 | 0.32 |
| COMPARATIVE EXAMPLE 16 | SILICON CARBIDE 80% + | 305 | 35 | 0.11 | 0.12 |
| COMPARATIVE EXAMPLE 17 | GLASS FRIT 20% | 305 | 72 | 0.24 | 0.17 |
| COMPARATIVE EXAMPLE 18 | | 305 | 32 | 0.10 | 0.44 |

| | PROPORTION OF PARTICLES WITH DIAMETER OF NOT LESS THAN HALF RIB THICKNESS [%] | CLOGGING OF DIE IN MOLDING | DEFECT CAUSED | BURNED BODY POROSITY [%] |
|---|---|---|---|---|
| EXAMPLE 1 | 0.0 | NOT CLOGGED | NONE | 40 |
| EXAMPLE 2 | 0.2 | NOT CLOGGED | NONE | 41 |
| EXAMPLE 3 | 1.5 | NOT CLOGGED | NONE | 43 |
| EXAMPLE 4 | 0.3 | NOT CLOGGED | NONE | 45 |
| EXAMPLE 5 | 2.8 | NOT CLOGGED | NONE | 43 |
| EXAMPLE 6 | 5.0 | CLOGGED LITTLE | NONE | 42 |
| EXAMPLE 7 | 1.6 | NOT CLOGGED | NONE | 43 |
| EXAMPLE 8 | 5.0 | CLOGGED LITTLE | NONE | 41 |
| EXAMPLE 9 | 0.0 | NOT CLOGGED | NONE | 42 |
| EXAMPLE 10 | 0.3 | NOT CLOGGED | NONE | 41 |
| COMPARATIVE EXAMPLE 1 | 0.0 | NOT CLOGGED | NONE | 30 |
| COMPARATIVE EXAMPLE 2 | 0.0 | NOT CLOGGED | NONE | 31 |
| COMPARATIVE EXAMPLE 3 | 7.0 | CLOGGED | DEFECT (1) | — |
| COMPARATIVE EXAMPLE 4 | 0.0 | NOT CLOGGED | DEFECT (2) | — |
| COMPARATIVE EXAMPLE 5 | 0.0 | NOT CLOGGED | DEFECT (2) | — |
| COMPARATIVE EXAMPLE 6 | 6.5 | CLOGGED | DEFECT (1) | — |
| COMPARATIVE EXAMPLE 7 | 0.0 | NOT CLOGGED | NONE | 31 |
| COMPARATIVE EXAMPLE 8 | 4.0 | NOT CLOGGED | NONE | 33 |
| COMPARATIVE EXAMPLE 9 | 10.6 | CLOGGED | DEFECT (1) | — |
| COMPARATIVE EXAMPLE 10 | 5.0 | NOT CLOGGED | DEFECT (2) | — |
| COMPARATIVE EXAMPLE 11 | 4.5 | NOT CLOGGED | NONE | 34 |
| COMPARATIVE EXAMPLE 12 | 10.6 | CLOGGED | DEFECT (1) | — |
| COMPARATIVE EXAMPLE 13 | 5.0 | NOT CLOGGED | DEFECT (2) | — |
| COMPARATIVE EXAMPLE 14 | 4.5 | NOT CLOGGED | NONE | 34 |
| COMPARATIVE EXAMPLE 15 | 0.0 | NOT CLOGGED | NONE | 30 |
| COMPARATIVE EXAMPLE 16 | 0.0 | NOT CLOGGED | DEFECT (2) | — |
| COMPARATIVE EXAMPLE 17 | 6.5 | CLOGGED | DEFECT (1) | — |
| COMPARATIVE EXAMPLE 18 | 4.0 | NOT CLOGGED | NONE | 32 |

DEFECT (1): MANY DEFECTS SUCH AS FRACTURES AND IMPROPER MOLDING ARE CAUSED BY CLOGGING OF THE DIE.
DEFECT (2): MANY DEFECTS SUCH AS SMALL HOLES, FRACTURES, AND THE LIKE ARE CAUSED BY LOW FLUIDITY OF THE KNEADED MATERIAL WITHIN THE DIE.

The honeycomb molded bodies of Examples 1 to 5, 7, 9, and 10 had no defects in shape are caused and no clogging of the die. The honeycomb molded bodies of Examples 6 and 8 had no defects in shape, and the incidence of clogging of the die was very low at about 1%. The porosities of the honeycomb structures of Examples 1 to 10 were not smaller than 40%.

On the contrary, the porosities of the honeycomb structures of Comparative Examples 1, 2, 7, 8, 11, 14, 15, and 18 were reduced to 30 to 34%. In the honeycomb structures of Comparative Examples 3, 6, 9, 12, and 17, the die was clogged in molding, and many fracture defects were caused.

In each of the honeycomb structures of Comparative Examples 4, 5, 10, 13, and 16, the kneaded material within the die in molding is low in fluidity, and many defects such as small holes were caused.

INDUSTRIAL APPLICABILITY

As described above, according to the present invention, it is possible to avoid defects in shape of the extruded body and the reduction in porosity of the honeycomb ribs by controlling the average particle diameter and the logarithmic standard deviation of the particle size distribution.

The invention claimed is:

1. A method of manufacturing a honeycomb structure, comprising:

adding water to silicon carbide particles and kneading the same into a kneaded raw material, the silicon carbide having an average particle diameter of not less than 2 μm and not more than a honeycomb rib thickness×0.23 and with a logarithmic standard deviation of a particle size distribution of not less than 0.15 and not more than 0.40;

extruding the kneaded raw material by extrusion into a honeycomb extruded body; and drying, calcining, and firing the extruded body.

2. The method of manufacturing a honeycomb structure according to claim 1, wherein the logarithmic standard deviation of the particle size distribution was not less than 0.17 and not more than 0.40.

3. The method of manufacturing a honeycomb structure according to claim 1, wherein a content of the silicon carbide is not less than 50 wt %.

4. The method of manufacturing a honeycomb structure according to claim 1, wherein a proportion of particles with a particle diameter of not less than half the honeycomb rib thickness is less than 5 wt %.

5. Silicon carbide particles for manufacturing a honeycomb structure by extrusion, wherein an average particle diameter is not less than 2 μm and not more than a honeycomb rib thickness×0.23 and a logarithmic standard deviation of a particle size distribution is not less than 0.15 and not more than 0.40.

* * * * *